(No Model.)

J. I. THORNYCROFT.
STEAM GENERATOR.

No. 454,390.

3 Sheets—Sheet 1.

Patented June 16, 1891.

Witnesses

Inventor.
John I. Thornycroft.

(No Model.) J. I. THORNYCROFT. 3 Sheets—Sheet 2.
STEAM GENERATOR.

No. 454,390. Patented June 16, 1891.

Witnesses
Inventor

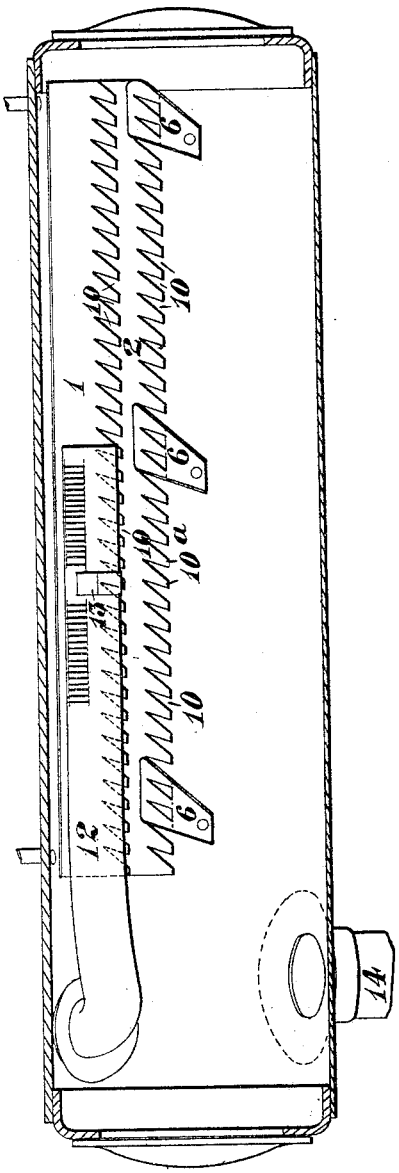

UNITED STATES PATENT OFFICE.

JOHN ISAAC THORNYCROFT, OF CHISWICK, ENGLAND.

STEAM-GENERATOR.

SPECIFICATION forming part of Letters Patent No. 454,390, dated June 16, 1891.

Application filed October 27, 1890. Serial No. 369,526. (No model.) Patented in France October 18, 1890, No. 208,937.

*To all whom it may concern:*

Be it known that I, JOHN ISAAC THORNYCROFT, a subject of the Queen of Great Britain and Ireland, residing at Chiswick, in the county of Middlesex, England, have invented Improvements in Steam-Generators, (for which I have obtained Letters Patent in France, No. 208,937, dated October 18, 1890,) of which the following is a specification.

In the specification of Letters Patent granted to me dated August 7, 1888, No. 387,547, there is described a steam-generator constructed with a steam collector and separator in which a curved baffle-plate having notched lower ends or edges is used to facilitate the separation of steam from streams of mixed steam and water discharged upon it from a number of pipes that form the sides and ends of the combustion-chamber of the generator.

Now my present invention has reference to an improved construction of steam collector and separator of the kind referred to, whereby the steam can be more freely discharged from the pipes in which it is generated and be more effectually separated than heretofore from the water with which it is mixed, so as to obtain the steam in a drier state, the liability to priming being lessened. For this purpose my improved collector and separator is constructed with a central plate and lateral or side plates, each of the latter being at a short distance from and so as to partly overlap the central one, leaving space between for the flow of water and steam. These plates, which have notched lower edges, are arranged longitudinally within the upper part of a cylindrical vessel, so as to form therewith a combined steam collector and separator, to the upper part of which the steam-generating pipes are secured, as before, the arrangement being such, however, that some of the pipes discharge steam and water onto the side plates, while the others discharge steam and water onto the central plate. Below this latter plate is the perforated steam-outlet pipe for conducting the steam to an engine.

In order that the nature of my present invention may be clearly understood reference is had to the accompanying drawings, in which—

Figure 1:
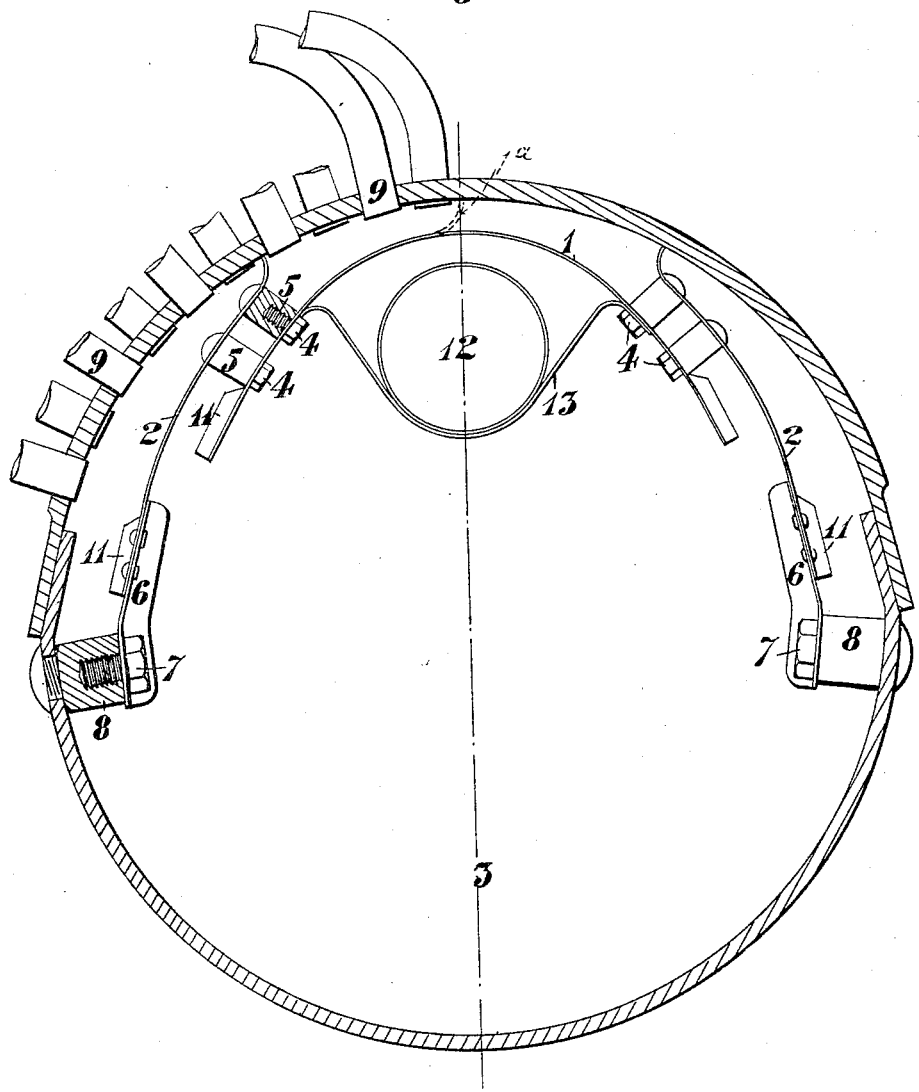
Figure 2:
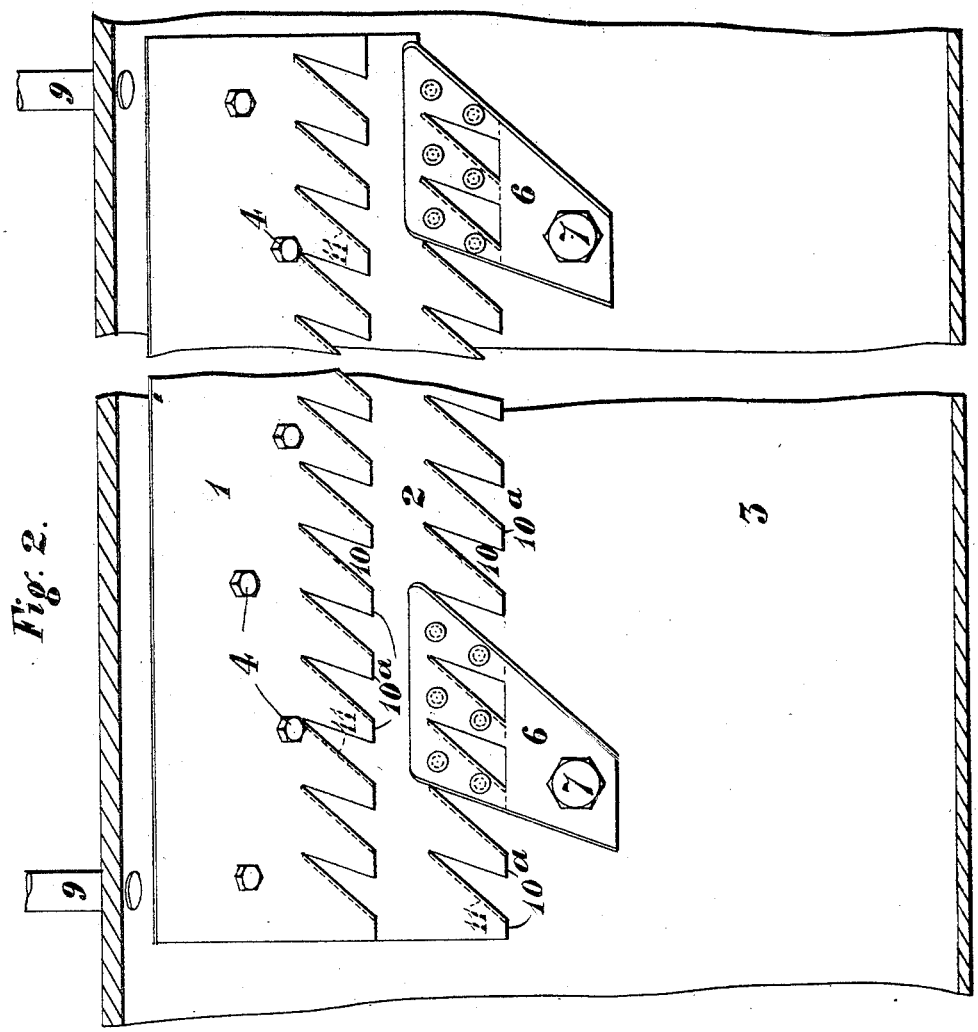

Figure 1 is a transverse section of a steam collector and separator constructed according to this invention. Fig. 2 is a longitudinal section of part of such a steam collector and separator. Fig. 3 is a longitudinal section to a smaller scale of the complete steam collector and separator.

1 is a central curved plate, and 2 2 are side plates constituting baffles or screens arranged longitudinally within the upper part of the cylindrical vessel 3. The central plate 1 is secured at intervals by set-screws 4 and distance-pieces 5 to the side plates 2, each of which is secured to the vessel 3 in the position shown by angle-plates 6, set-screws 7, and distance-pieces 8. Each of these distance-pieces 8 may, as shown, be screwed through the shell of the vessel 3 and be riveted over on the outside to make a tight joint.

9 9 are the pipes secured to the top of the vessel 3, and through which streams of mixed steam and water are discharged partly upon the central plate and partly upon the side plates.

Each of the plates 1 and 2 is formed with notches 10, each having a flange 11 at one side. Through these notches the steam passes to the under side of the central plate 1, while the water with which it is mixed runs off at the lower edges 10$^a$ into the bottom of the vessel 3.

12 is a perforated steam-outlet pipe supported below the plate 1 by a metal strip 13.

14 is a return-pipe, through which the water in vessel 3 is returned to a water-chamber below and thence to the pipes 9.

As will be obvious, the central plate 1 may be replaced by two curved plates having their upper edges bent and arranged, as indicated in dotted lines in Fig. 1, so as to be above the highest inlet-opening for steam and water. The lower sides or edges of these plates are or may be arranged similarly to those of the single central plate 1. (Shown in full lines.) In some cases, as when streams of steam and water are only introduced into the combined collector and separator at one side thereof, only one set of overlapping plates may be used, arranged at one side of a vertical plane passing through the center of the combined collector and separator.

What I claim is—

1. In a steam-generator, a steam collector and separator comprising a vessel having a number of steam-generating pipes connected to its upper side, and a central baffle-plate or screen and lateral or side baffle-plates or screens, the latter being arranged at a short distance from and so as to partly overlap said central plate, substantially as herein described, for the purpose specified.

2. In a steam-generator, a steam collector and separator comprising a cylindrical vessel having a number of steam-generating pipes connected to its upper side, and a baffle or screen arranged opposite and below the outlet ends of said pipes and composed of curved plates extending longitudinally in the upper part of said vessel, said plates being arranged a short distance apart and so as to partly overlap one another, substantially as herein described, for the purpose specified.

3. In a steam-generator, a steam collector and separator comprising a vessel having steam-generating pipes connected to its top at each side of a vertical plane passing through its center, overlapping baffle-plates arranged at a distance from each other and opposite the outlet ends of said pipes, and a steam-outlet pipe arranged in the upper part of said vessel, substantially as herein described, for the purpose specified.

4. In a steam-generator, a steam collector and separator comprising a cylindrical vessel, to the upper part of which the steam-generating pipes 9 are connected, a baffle arranged in the upper part of said vessel and below said pipes and consisting of a central curved plate 1 and curved side plates 2, each having notched lower edges and connected together so that the central plate is carried by and at a short distance from the side plates, which partly overlap it and are secured to said vessel, and a perforated steam-outlet pipe located below said central plate, substantially as herein described, for the purpose set forth.

In testimony whereof I have signed my name to this specification in the presence of two subscribing witnesses.

JOHN ISAAC THORNYCROFT.

Witnesses:
W. CROSS,
46 Lincoln's Inn Fields, London, W. C.
WM. THOS. MARSHALL,
2 Pope's Head Alley, Cornhill, London, Gentleman.